United States Patent
Ramakrishnan et al.

(10) Patent No.: US 7,953,089 B1
(45) Date of Patent: May 31, 2011

(54) SYSTEMS AND METHODS FOR MULTICAST SWITCHING IN A PRIVATE VLAN

(75) Inventors: Vijayan Ramakrishnan, Santa Clara, CA (US); Marco E. Foschiano, Pinerolo (IT); Chickayya G. Naik, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 11/434,728

(22) Filed: May 16, 2006

(51) Int. Cl.
*H04L 12/28* (2006.01)
*H04L 12/56* (2006.01)
*H04L 12/54* (2006.01)
*G06F 9/26* (2006.01)
*G06F 9/34* (2006.01)

(52) U.S. Cl. ........ 370/392; 370/401; 370/409; 370/428; 711/203

(58) Field of Classification Search .................. 370/389, 370/392, 395.53, 401
See application file for complete search history.

(56) References Cited

U.S. PATENT DOCUMENTS

| | | | |
|---|---|---|---|
| 5,959,989 A * | 9/1999 | Gleeson et al. ............... 370/390 |
| 6,041,358 A * | 3/2000 | Huang et al. .................. 709/238 |
| 6,236,643 B1 * | 5/2001 | Kerstein ........................ 370/254 |
| 6,563,832 B1 * | 5/2003 | Stuart et al. .................... 370/403 |
| 6,741,592 B1 * | 5/2004 | Edsall et al. .................... 370/389 |
| 6,765,914 B1 * | 7/2004 | Jain et al. .................. 370/395.31 |
| 6,813,250 B1 * | 11/2004 | Fine et al. ...................... 370/256 |
| 6,873,602 B1 * | 3/2005 | Ambe ........................... 370/254 |
| 6,937,576 B1 * | 8/2005 | Di Benedetto et al. ........ 370/256 |
| 6,975,581 B1 * | 12/2005 | Medina et al. ................. 370/401 |
| 7,006,431 B1 * | 2/2006 | Kanekar et al. ................ 370/217 |
| RE40,999 E * | 11/2009 | Frantz et al. ................ 370/395.3 |
| 7,693,158 B1 * | 4/2010 | Carrie ....................... 370/395.53 |
| 2002/0009078 A1 * | 1/2002 | Wilson et al. .................. 370/389 |
| 2002/0027906 A1 * | 3/2002 | Athreya et al. ................ 370/386 |
| 2002/0091795 A1 * | 7/2002 | Yip .................................. 709/218 |
| 2002/0181465 A1 * | 12/2002 | Tsuchiya et al. ............... 370/392 |
| 2003/0165140 A1 * | 9/2003 | Tang et al. ...................... 370/393 |
| 2003/0235191 A1 * | 12/2003 | Heggarty et al. .............. 370/389 |
| 2004/0032868 A1 * | 2/2004 | Oda et al. ....................... 370/389 |
| 2004/0047320 A1 * | 3/2004 | Eglin ............................. 370/338 |
| 2004/0081171 A1 * | 4/2004 | Finn .......................... 370/395.53 |
| 2004/0081180 A1 * | 4/2004 | De Silva et al. ............... 370/402 |
| 2004/0202171 A1 * | 10/2004 | Hama ......................... 370/395.1 |
| 2005/0091313 A1 * | 4/2005 | Zhou et al. ..................... 709/204 |
| 2005/0120378 A1 * | 6/2005 | Jalonen ........................... 725/97 |
| 2005/0154790 A1 * | 7/2005 | Nagata et al. .................. 709/223 |
| 2005/0195811 A1 * | 9/2005 | Wu et al. ........................ 370/389 |
| 2005/0198383 A1 * | 9/2005 | Rose et al. ...................... 709/245 |
| 2006/0018333 A1 * | 1/2006 | Windisch et al. .............. 370/432 |
| 2006/0023724 A1 * | 2/2006 | Na et al. .................... 370/395.53 |
| 2006/0029001 A1 * | 2/2006 | Mensch et al. ................. 370/254 |
| 2006/0039378 A1 * | 2/2006 | Medina et al. ................. 370/392 |
| 2006/0221960 A1 * | 10/2006 | Borgione ....................... 370/390 |
| 2006/0251065 A1 * | 11/2006 | Hamamoto et al. ........... 370/389 |
| 2007/0127414 A1 * | 6/2007 | Sridhar et al. ................. 370/331 |
| 2007/0127459 A1 * | 6/2007 | Lo et al. ........................ 370/389 |
| 2008/0165705 A1 * | 7/2008 | Umayabashi et al. ........ 370/256 |

\* cited by examiner

*Primary Examiner* — Alpus H Hsu
*Assistant Examiner* — Andrew Oh
(74) *Attorney, Agent, or Firm* — Campbell Stephenson LLP

(57) ABSTRACT

A Multicast Listener Discovery (MLD) protocol query and/or report snooping process is modified to appropriately map secondary PVLAN identifiers to corresponding primary PVLAN identifiers, thereby accommodating other system elements that are otherwise unaware of primary/secondary PVLAN distinctions. Special cases are also accommodated where reverse path forwarding (RPF) checks in support of multicast operation might otherwise fail due to primary/secondary PVLAN distinctions. Additional steps are taken to ensure that PVLAN information properly accounts for changes in configuration and/or location of various network hosts.

21 Claims, 5 Drawing Sheets

SYSTEMS AND METHODS FOR MULTICAST SWITCHING IN A PRIVATE VLAN

FIELD OF THE INVENTION

This invention relates to private virtual local area networks (PVLANs) and, more particularly, to multicast switching in a PVLAN environment.

BACKGROUND OF THE INVENTION

Telecommunications networks facilitate exchange of numerous types of data (e.g., computer data, voice data, video data, etc.). Local area networks (LANs) of devices may be formed within a telecommunications network in order to increase network bandwidth usage efficiency by segregating network traffic within such a LAN. In particular, a group of devices in relatively close physical proximity and sharing a common administrative purpose may be designated as members of a LAN.

More recently, virtual LANs ("VLANs") have been developed. A VLAN is a switched network arbitrarily and logically segmented according to some criteria that is not necessarily related to the physical relationship of network nodes, e.g. function, project team, application, etc. Thus, a VLAN includes a grouping of network nodes (typically defined in terms of the ports on a switching device to which the nodes are connected) virtually constructed regardless of real physical connection. In general, any switch port can belong to a VLAN, and unlike LANs, VLANs contain broadcast and multicast traffic within a predefined group to limit unnecessary bandwidth use in the overall network. Unicast, broadcast, and multicast packets are forwarded and flooded only to stations in the VLAN. Each VLAN is considered a logical network, and packets destined for stations that do not belong to the VLAN are forwarded through a router or bridge. Because a VLAN is considered a separate logical network, it contains its own bridge Management Information Base (MIB) information and can support its own implementation of the Spanning Tree Protocol (STP).

To provide further segmentation and control, so-called private VLANs (PVLANs) can be defined based on one or more VLANs. PVLANs provide Layer 2 isolation between ports within the same private VLAN. A PVLAN consists of one primary VLAN and optionally one or more secondary VLANs. The primary VLAN is a basic representation of the entire PVLAN. It has a Layer 3 interface at a router, and contains by default all ports in the PVLAN. Typically, a single IP subnet address mask is assigned to a primary VLAN. There are three types of private VLAN ports: (1) promiscuous—a promiscuous port can communicate with all interfaces, including the community and isolated ports within a private VLAN; (2) isolated—an isolated port has complete layer 2 separation from other ports within the same private VLAN except for the promiscuous port (private VLANs block all traffic to isolated ports except traffic from promiscuous ports, and traffic received from an isolated port is forwarded only to promiscuous ports); (3) community—community ports communicate among themselves and with their promiscuous ports, and these interfaces are isolated at layer 2 from all other interfaces in other communities or isolated ports within their private VLAN. Secondary VLANs are used to achieve traffic isolation within the PVLAN. Depending on various security requirements, multiple secondary VLANs may be deployed.

When a packet is routed from an outside network to a PVLAN, it is put in the primary VLAN. In other words, the primary VLAN is the basis for all Layer 3 activities, such as routing, ACL, NAT, etc. Router functionality typically only operates in terms of primary VLANs, and not secondary VLANs. In contrast, the isolated and community VLANs used as secondary VLANs are purely Layer 2 entities. Their existence and configuration only affects switching behavior, and they are generally transparent from a routing point of view.

The different levels of PVLAN awareness among switching and routing devices operating in the same network device, or for that matter the same network, can complicate operation of certain network technologies. For example, one approach to providing the benefits of inter-VLAN routing and also ensuring a certain level of performance for the associated LAN has been to implement Layer 3 switches, which are essentially Layer 2 switches with a routing engine that is designed to specifically route traffic between VLANs in a LAN environment. Thus, Layer 3 switches make switching decisions based on both Layer 2 and Layer 3 information, a technique sometimes referred to as multi-layer switching (MLS).

Internet Protocol (IP) multicast is a bandwidth-conserving technology that reduces traffic by simultaneously delivering a single stream of packets to multiple recipients. IP Multicast delivers source traffic to multiple receivers without adding any additional burden on the source or the receivers while using the least network bandwidth of any competing technology. Multicast packets are replicated in the network by routers enabled with suitable multicast protocols. Although IP multicast is essentially a Layer 3 technology, the different protocols and techniques used to support IP multicast operate at different layers. Thus, the differing Layer 2 and Layer 3 treatment of PVLANs can be at odds with support requirements for IP multicast.

Accordingly, it is desirable to ensure that PVLAN implementations interoperate with IP multicast, and particularly with multicast functionality provided by IP version 6 (Ipv6).

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. As will also be apparent to one of skill in the art, the operations disclosed herein may be implemented in a number of ways, and such changes and modifications may be made without departing from this invention and its broader aspects. The description is intended to be illustrative and should not be taken to be limiting.

The systems, methods, devices, and techniques of the present application emphasize accommodating the use of private VLANs (PVLANs) in the context of Internet Protocol version 6 (IPv6) multicast operation. Consequently, various related protocols, data formats, message formats, and the like will be known to those skilled in the art. Such protocols and formats are, for example, described in numerous standards documents, IETF documents, RFCs, and the like. Although the present application emphasizes PVLAN operation in IPv6 multicast environments, the disclosed systems, methods, devices, and techniques can be extended for use in other areas of PVLAN operation, and to future multicast implementations.

Figure 1:
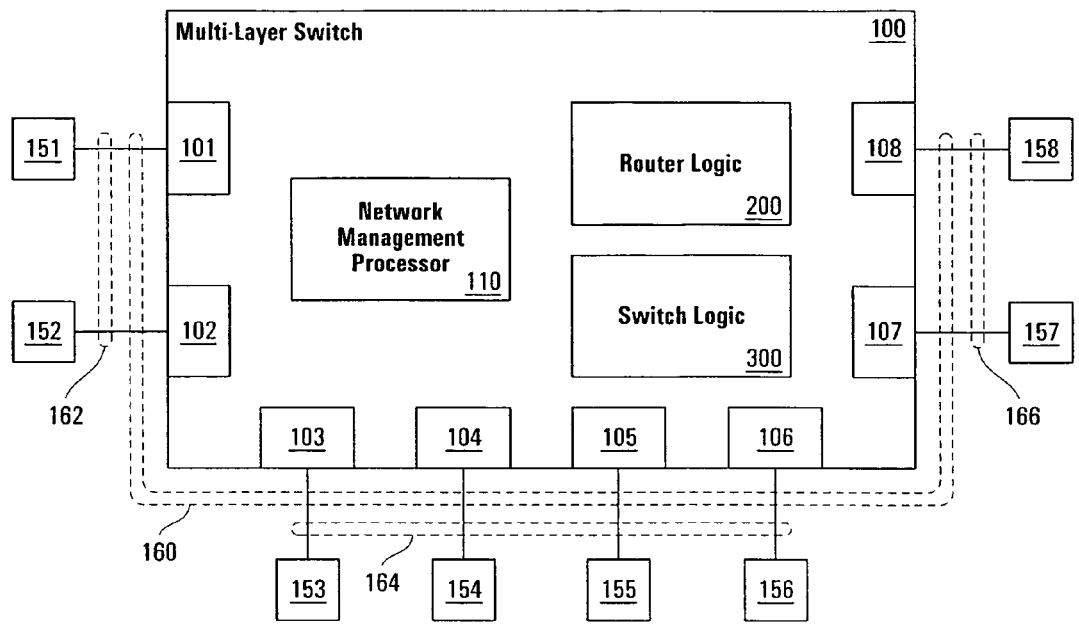
FIG. 1 illustrates a simplified block diagram of a network system including a multi-layer switch in accordance with embodiments of the present invention and having various attached hosts and defined PVLANs.

FIG. 1 illustrates a simplified block diagram of a network system including a multi-layer switch in accordance with embodiments of the present invention and having various attached hosts and defined PVLANs. Although multi-layer switch architectures are emphasized in the examples of the present application, the disclosed systems, methods, devices, and techniques can be use in numerous different types of network devices including switches, switch-routers, routers, router-switches and storage network devices. The term "switch" is used in this specification to describe equipment used to direct information over a network based on address information. Those skilled in the art will understand that such equipment includes, for example, switches, multi-layer switches, and routers. For example, a switch may direct an information packet based on address information contained within the packet. However, embodiments of the present invention are not limited to use in a switch, but may be used at any point in a network. Thus, the term "network" as used herein is to be broadly construed to mean any communication system in which carried information has a characteristic subject to monitoring.

As noted above, multi-layer switches or layer 3 switches make switching decisions based on both layer 2 and layer 3 information. The interplay of L2 and L3 based operations in multi-layer switch 100 means that different parts of the device will typically have different awareness levels of different protocol layer information. Multi-layer switch 100 includes a number of functional blocks such as network management processor 110, router logic 200, and switch logic 300. Multi-layer switch 100 also includes numerous ports 101-108, for facilitating intercommunication among various network stations such as multi-layer switch 100 and hosts 151-158 (e.g., computer systems, other network devices, etc.).

Note that FIG. 1 is schematic in nature, and many common components are not shown for simplicity. For example, ports 101-108 can be implemented in various ways, such as dedicated ports (including all necessary physical layer hardware), modular ports or line cards, and the like. Both data and control information is sent between various switch components over one or more bus lines and may include a specialized switch fabric. Well known interface details, memory structures, and support logic are also not illustrated. Moreover, the various components of multi-layer switch 100 can be organized in different ways. For example, the functionality of 110, 200, and 300 can be provided by one or more integrated circuits on a single printed circuit board, or divided among several circuit boards. Similarly, the functionality can be built into specialized hardware components (e.g., ASICs and FPGAs), provided via software executing on one or more general purpose integrated circuits (e.g., embedded processors), or some combination of the two.

Thus, the system of FIG. 1 generally illustrates a network (or portion thereof) based on a collection of interconnected communication links and subnetworks attached to the various stations. The stations might be so-called end stations, e.g., computer systems or hosts 151-158 or intermediate stations such as multi-layer switch 100. Moreover, various stations might be further divided into sub-components. For example, switch logic 300 can be designed to operate independently of router logic 200, thereby guaranteeing that multi-layer switch 100 provide desired L2 functionality. As such, switch logic 300 might itself be considered an intermediate station. Communication among the various network components occurs by exchanging data frames or packets according to one or more predefined protocols, as is well known in the art.

FIG. 1 also illustrates several PVLANs 160-166. In this example, all of ports 101-108 are configured to be members of PVLAN 160 which is also configured as a primary PVLAN. Although all the illustrated ports of multi-layer switch 100 are shown as part of PVLAN 160, this need not be the case, and various different primary PVLANs can be configured. Secondary PVLANs 162-166 are configured to include ports 101-102, 103-106, and 107-108, respectively. The secondary. PVLANs 162-166 can include various assortments of secondary PVLAN ports, i.e., community, isolated, and promiscuous, as desired. Again, the particular configuration of ports and corresponding PVLANs is arbitrary, and numerous different configurations, e.g., including ports on other devices, can be utilized.

Network management processor 110 provides for system control and configuration including loading of runtime code to various line cards and modules, as well as system diagnostic services. Processor 110 is also typically configured to execute and manage instances of the spanning tree protocol (STP) for each of the VLANs configured by multi-layer switch 100. Furthermore, processor 110 provides various support services such as execution of an SNMP agent that facilitates the exchange of management information between network devices. Finally, processor 110 is typically responsible for executing other portions of the TCP/IP stack and communicating relevant configuration information to/from other switch components such as router logic 200 and switch logic 300.

Figure 2:
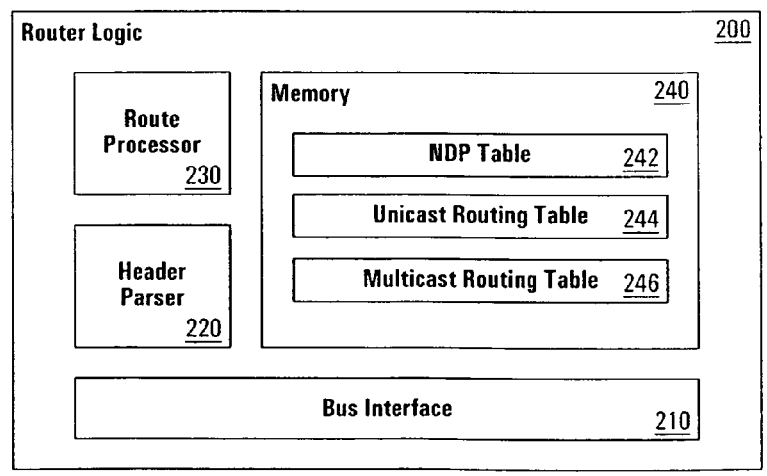
FIG. 2 illustrates a simplified block diagram of the router logic of the multi-layer switch of FIG. 1.

FIG. 2 illustrates router logic 200 in greater detail. Router logic 200 implements various portions of the multicast PVLAN accommodation techniques of the present application. In the example shown, router logic 200 includes one or more bus interfaces 210 for communicating with other components of multi-layer switch 200, a route processor 230, a header parser ASIC 220 for extracting relevant packet header information and forwarding it to route processor 230, and memory 240. Memory 240 includes storage locations addressable by processor 230 (and potentially other components of multi-layer switch 100) for storing software and data structures associated routing operations. Examples of such software (not shown) include operating systems, routing algorithm implementations, routing protocol implementations, user interfaces providing access to router functionality, and the like. Such software (or at least portions thereof) is executed by route processor 230. Examples of the data structures stored in memory 240 include neighbor discovery protocol (NDP) table 242, unicast routing table 244, and multicast routing table 246.

NDP is a protocol used by IPv6 network nodes (hosts and routers) to determine the link-layer addresses for neighbors known to reside on attached links and to quickly purge cached values that become invalid. Hosts also use NDP to find neighboring routers that are willing to forward packets on their behalf. Finally, nodes use the protocol to actively keep track of which neighbors are reachable and which are not, and to detect changed link-layer addresses. When a router or the path to a router fails, a host actively searches for functioning alternates. NDP table 242 includes various types of information about nodes accessible by the router logic, and is extended in embodiments of the present invention to include information needed for properly accommodating PVLANs. Tables 244 and 246 are used by route processor 230, which performs unicast and multicast look-up operations against the tables to find appropriate entries specifying outgoing interfaces for the packet. For multicast look-ups, table entries are typically accessed based on IP source address or IP destination address (e.g., a multicast group address). Unicast table 244 is used in a similar manner to determine which port or interface is used to reach a requested IP destination address, and is also used in the course of performing reverse path forwarding (RPF) checks as described below.

Router logic 200 can be configured to implement numerous other types of router functionality, and thus may include various other hardware, software, and data structure components, as is well known to those skilled in the art.

Figures 3, 4, 5:
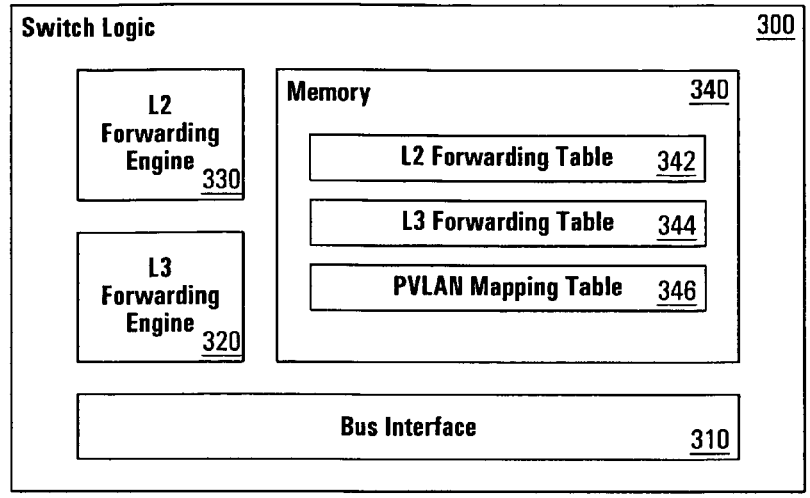
FIG. 3 illustrates a simplified block diagram of the switch logic of the multi-layer switch of FIG. 1.
FIG. 4 illustrates a simplified example of a VLAN mapping table for use by the multi-layer switch of FIG. 1.
FIG. 5 illustrates a simplified example of an L2 forwarding table for use by the multi-layer switch of FIG. 1.

FIG. 3 is a functional block diagram of switch logic 300, which also implements various portions of the multicast PVLAN accommodation techniques of the present application. Switch logic 300 includes one or more bus interfaces 310, layer 3 forwarding engine 320, layer 2 forwarding engine 330, and memory 340. Memory 340 includes storage locations addressable by both engine 320 and engine 330 (and potentially other components of multi-layer switch 100) for storing software and data structures associated switching operations. In general, L2 forwarding engine 330 determines L2 based switching operations by searching L2 forwarding tables such as table 342. It can also be configured to provide related functionality such as access control list (ACL) and quality of service (QoS) look-ups for classification matching/filtering and performing subsequent actions. Similarly, L3 forwarding engine 320 searches various L3 forwarding tables (344) such as forwarding information base (FIB) tables, adjacent tables, etc., to make L3 switching decisions. Such L3 forwarding tables are generally populated with information provided by router logic 200.

In a typical implementation, L2 forwarding engine 330 and L3 forwarding engine 320 make forwarding decisions for frames/packets passing through multi-layer switch 100 and drive those decisions to port control circuitry to implement the forwarding decisions by transferring frames over the appropriate port. Engines 320 and 330 can be implemented in a number of different ways including: one or more general purpose processors executing specialized software, one or more ASICs, one or more FPGAs, or the like. Thus, switch logic 300 cooperates with the route logic 200 to execute software programs and/or manipulate data structures in accordance with the present invention. Other common multi-layer switch components (not shown) can include packet/frame replication circuits, additional header parsers, port interfaces, specialized memory circuits (e.g., CAMs, and TCAMs), additional processors, etc.

FIGS. 4 and 5 illustrate in greater detail examples of VLAN mapping table 346 and L2 forwarding table 342, respectively. VLAN mapping table 346 provides association information among primary PVLANs and corresponding secondary PVLANs. This information is used, for example, by L2 forwarding engine 330, to translate PVLAN identifier information from a secondary identifier to primary identifier as needed. As such, table 346 can be organized in various ways. As shown, table 346 is indexed by secondary PVLAN identifier, so that a search based on secondary PVLAN identifier yields the corresponding primary PVLAN to which the secondary PVLAN belongs. In such an example, the look-up logic would either (1) need to know that the PVLAN identifier it is searching for is a secondary PVLAN identifier (e.g., because table 346 is indexed only by secondary PVLAN identifier), or (2) need to know that failure to find the target PVLAN identifier in the table means that the identifier is in fact a primary PVLAN identifier. Numerous different search schemes and table organization schemes can be implemented. For example, table 346 could have index values for all PVLAN identifiers (both primary and secondary), but for primary PVLANS the corresponding primary PVLAN identifier is the same value. However table 346 is organized, and however corresponding search logic is implemented, PVLAN mapping table 346 is used to ensure that the appropriate type of PVLAN identifier is used in various other data structures (e.g., L2 forwarding table 342) and messages.

PVLAN mapping table 346 is typically populated with information from the software responsible for configuring (or allowing a user to configure) VLANs and PVLANs. This software might be the operating system executing in router logic 200, the software executing on network management processor 110, software on some other programmable logic, or even hard-coded logic. As changes are made to PVLAN configurations, those changes are propagated to PVLAN mapping table 346 by a suitable mechanism.

L2 forwarding table 342 is accessed by L2 forwarding engine 330 to render a forwarding decision for frames passing through multi-layer switch 100. As shown, L2 forwarding table 342 includes a variety of entries such as MAC address, VLAN ID, and corresponding ports. Entries in table 342 are typically accessed by searching on the pair of index values represented by the MAC address and VLAN ID. This value pair is sometimes referenced by the designation (G, C), i.e., the group (G) MAC destination address and the subnetwork color (C) VLAN ID. In addition to (or instead of) the one or more corresponding port values included in table 342, each L2 (G,C) entry can include other index values such as indexes values pointing to port select signal maps used by local target logic. Thus, L2 forwarding table 342 is generally used to associate a (G,C) pair with a corresponding switch interface.

As illustrated in table 342, all VLAN IDs are presented in terms of primary PVLAN identifiers, i.e., for VLANs that are configured to be private, only the corresponding primary PVLAN identifier is recorded. Using only one VLAN ID is common because it simplifies system implementation, many VLANs will not be implemented as private VLANs, and certain other elements of the system need only track PVLANs in terms of the primary PVLAN designation. However, there are many instances where information used to populate the L2 forwarding table 342 arrives at the switch with a secondary PVLAN identifier.

As will be appreciated by those skilled in the art, tables 342 and 346, are merely exemplary, and numerous variations can be implemented in keeping with the techniques of the present invention. For example, the tables can include various other pieces of information, they can be maintained by/in other components of switch 100, etc.

Figures 6, 7:
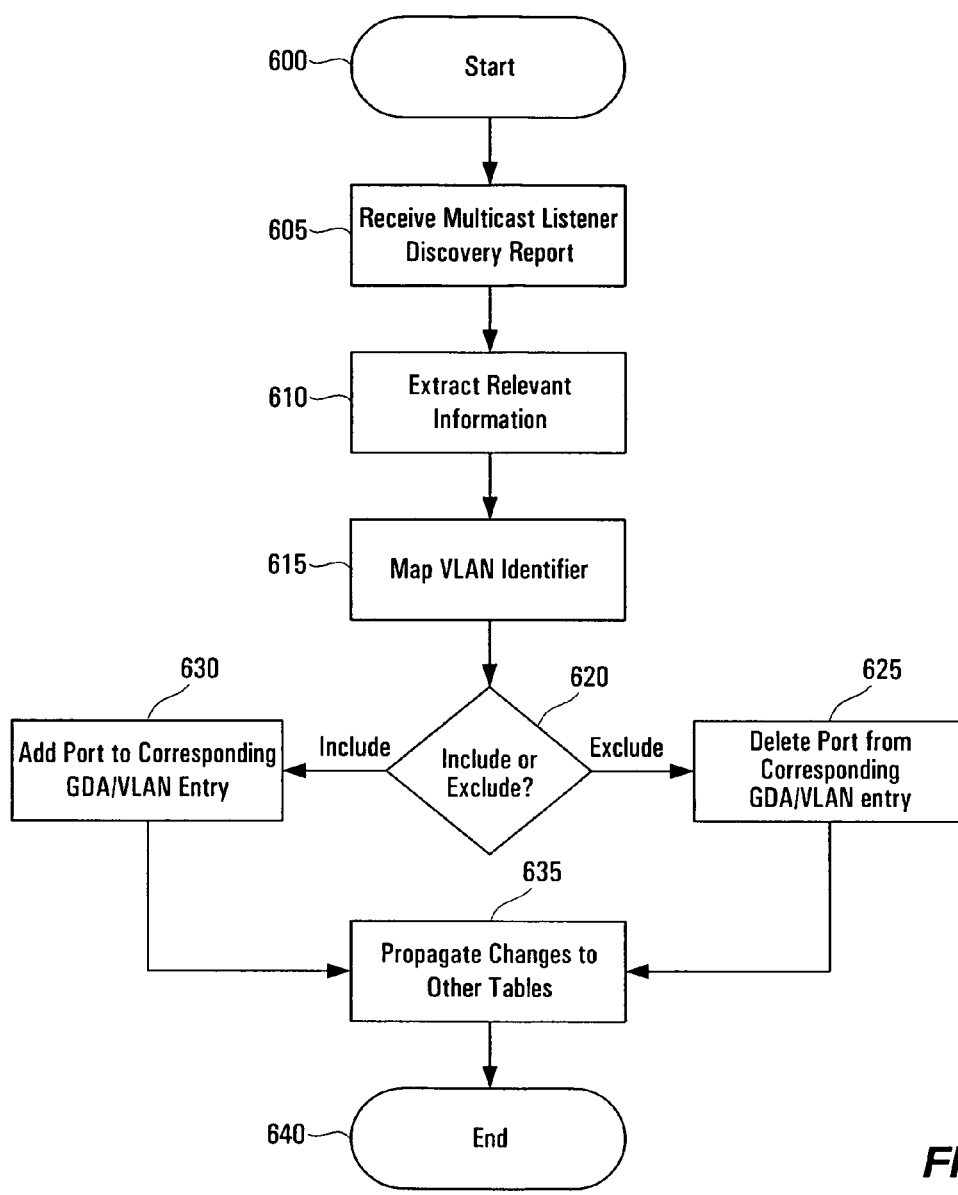
FIG. 6 is a flow chart illustrating techniques of the present invention.
FIG. 7 illustrates a simplified example of an L3 forwarding table for use by the multi-layer switch of FIG. 1.

Since primary and secondary PVLAN identifiers are merged in L2 forwarding table 342, PVLAN mapping table 346 is used to perform the mapping from secondary PVLAN identifiers to primary PVLAN identifiers. L2 forwarding engine 300 performs this mapping both when learning the L2 entry, i.e., so that it always stores entries in terms of the primary PVLAN identifier, and when looking up MAC and VLAN information to forward the packet. In this phase, the VLAN identifier of the packet is not changed, but the forwarding decision is made based on the primary PVLAN identifier. FIG. 6 illustrates a process for converting secondary PVLAN identifiers to primary VLAN identifiers and accordingly populating the L2 forwarding table 342.

The type of mapping afforded by table 346 is particularly important in support of multicast operations. An IPv6 multicast group is an arbitrary group of receivers that want to receive a particular data stream. Like other multicast groups, this group has no physical or geographical boundaries—receivers can be located anywhere on the Internet or in any private network. Receivers that are interested in receiving data flowing to a particular group must join the group by signaling their local router. This signaling is achieved with the multicast listener discovery (MLD) protocol. Routers use the MLD protocol to learn whether members of a group are present on their directly attached subnets. Hosts join multicast groups by sending MLD report messages. The network then delivers data to a potentially unlimited number of receivers, using only one copy of the multicast data on each subnet. IPv6 hosts that wish to receive the traffic are known as group members. The packets delivered to group members are identified by a single multicast group address. Membership in a multicast group is dynamic; hosts can join and leave at any time, and there is generally no restriction on the location or number of members in a multicast group. Moreover, a host can be a member of more than one multicast group at a time.

MLD snooping allows switches to examine MLD packets and make forwarding decisions based on their content. MLD snooping constrains IPv6 multicast traffic at layer 2 by configuring layer 2 LAN ports dynamically to forward IPv6 multicast traffic only to those ports that want to receive it. MLD uses various types of messages including multicast listener reports. These reports (including current state records, filter mode change records, and source list change records) specify whether a particular host should be included or excluded for specified multicast groups. A switch snoops these reports, updates relevant tables, and forwards the reports to a multicast router.

FIG. 6 is a flow chart illustrating PVLAN mapping and L2 forwarding table construction techniques. Operation begins at 600 where it is assumed that relevant PVLANs are configured, the PVLAN map is populated, and the switch is performing MLD snooping in support of IPv6 functionality. The switch receives some type of MLD report (605). That report can be in response to a query sent out by a router such as routing logic 300 or some other router attached to the switch. The report can also be an unsolicited report sent to the router by a host that wishes to join a multicast group. Switch hardware can distinguish MLD information packets from other packets for the multicast group. However the report arrives at the switch, the report is parsed and relevant information extracted in 610. The extracted information typically includes some indication whether the host is requesting to join or leave a group, the corresponding group address, and a VLAN identifier. The switch also tracks information describing the port or interface through which the report arrived.

Next, as shown in 615, the VLAN identifier is mapped as necessary using, for example, a table such as PVLAN mapping table 346. As noted above, not all VLAN identifiers associated with received MLD reports will be PVLANs. For those that are, VLAN identifiers that represent secondary PVLANs are mapped to the corresponding primary PVLAN identifier. The format of the mapping table and the logic for searching the able can vary in numerous ways. So, for example, if host 152 of FIG. 1 transmitted an MLD report requesting inclusion in group GDA1, the switch would receive the report on port 102 and the report would carry the identifier of secondary PVLAN 162. Thus, operation 615 involves a look-up against table 346 to determine the primary PVLAN (160) corresponding to secondary PVLAN 162.

If it is determined in 620 that the report is requesting inclusion of the host in the specified multicast group, e.g., the MLD message has an INCLUDE indicator, operation transitions to 630 where port information (i.e., the port on which the message arrived) is added to the corresponding group address/VLAN entry in the L2 forwarding table. Again, the VLAN ID used in this case is the primary. PVLAN identifier (if there is one) identified in 615. If there is no L2 forwarding table entry corresponding to the group address/VLAN, one is created. If such an entry already exists, the new port identifier is added to the portmask for the entry. Next, in 635, the changes to the L2 forwarding table are propagated to other tables as necessary. If it is determined in 620 that the report is requesting that the host leave the specified multicast group, e.g., the MLD message has an EXCLUDE indicator, operation transitions to 625 where port information (i.e., the port on which the message arrived) is removed from the corresponding group address/VLAN entry in the L2 forwarding table. The changes are propagated to other tables as desired/necessary, and the process ends at 640. Note that various other operations associated with MLD implementation and multicast operation generally are not shown in FIG. 6, but will be known to those having ordinary skill in the art.

Figures 8, 9:
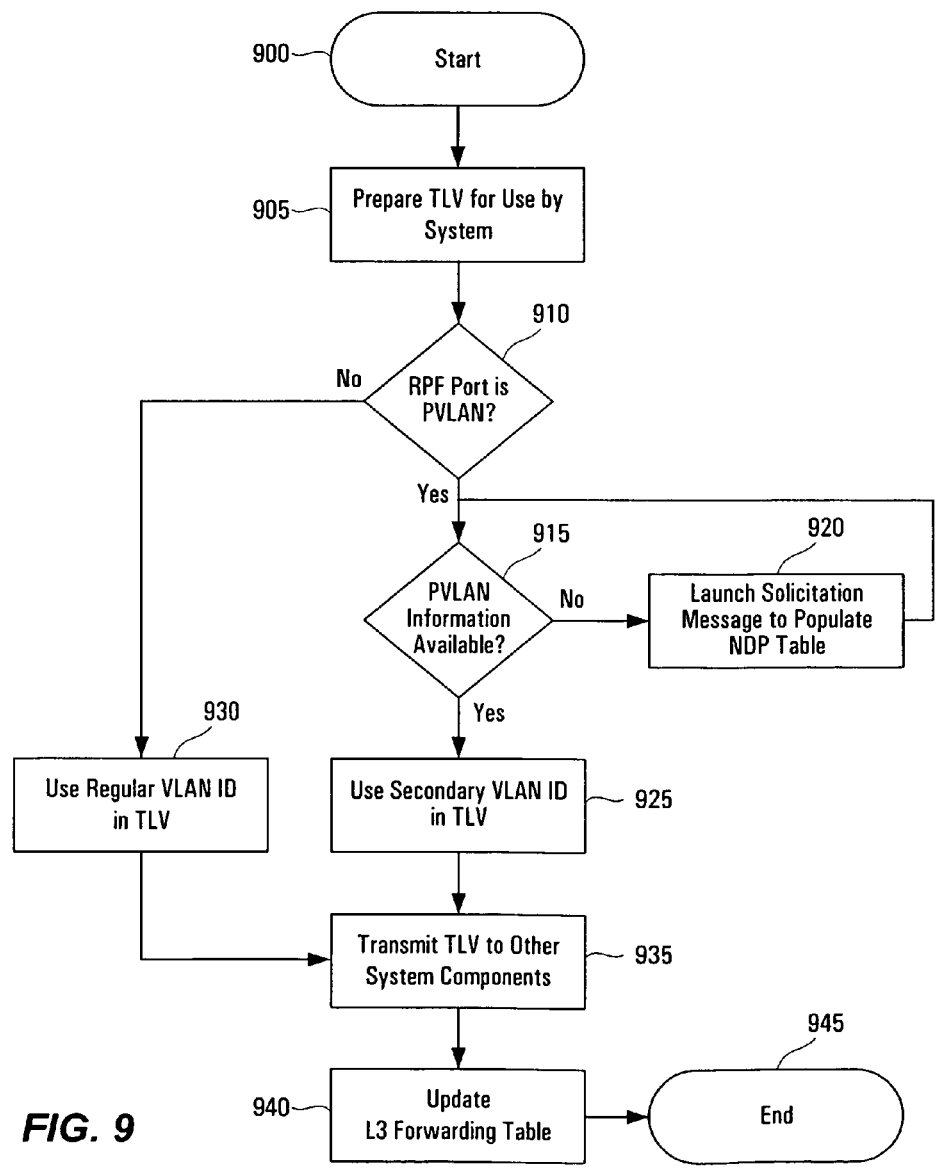
FIG. 8 illustrates a simplified example of a Neighbor Discovery Protocol (NDP) table for use by the multi-layer switch of FIG. 1.
FIG. 9 is a flow chart illustrating additional techniques of the present invention.

FIGS. 7 and 8 illustrate in greater detail examples of L3 Forwarding table 344 and NDP table 242, respectively for use in the present invention. Layer 3 switched multicast packets rely on L3 forwarding table 344 which is indexed by the triplet: source IP address (S), multicast group address (G), and VLAN identifier (C) (S,G,C). These (S, G, C) entries are typically populated by router logic 200. Table 344 can include other information such as other IP or MAC addresses, index fields such as the aforementioned LTL index, control fields, and the like. In still other examples, table 344 provides pointers to entries in a multicast expansion table (not shown) used to implement various multicast shortcut techniques. Certain entries in table 344 are specifically made (as described below) to accommodate proper multicast operation in a PVLAN environment.

As noted above, NDP is used by IPv6 hosts or routers to find the link layer address of neighbors and to quickly update cached values of link layer addresses (e.g., in table 242) when neighbor configurations change. NDP is also used to discover neighboring routers and the services provided by those routers. If a router becomes unreachable, an alternative is searched for immediately. Thus, NDP and the information collected using NDP are used to perform or assist in: router discovery, address prefix discovery, IPv6 routing parameter discovery (e.g., link MTU, hop limit values, etc.), automatic address configuration, address resolution, next hop determination, neighbor reachability determination, duplicate address detection, and redirect operations. To accomplish this, NDP uses various ICMP messages: router solicitation, router advertisements, neighbor solicitation, neighbor advertisement, and redirect. Consequently, the contents of table 242 can be varied, and NDP tables can be maintained as multiple different tables. However, NDP table 242 includes a special extension for managing secondary PVLANS, namely secondary PVLAN identifier information for each entry that has a corresponding secondary PVLAN.

NDP table 242 is typically maintained by system router functionality, such as router logic 200. However, that functionality is often not designed to track secondary PVLAN information. Router software is therefore modified to explicitly cause secondary PVLAN information to be added to extended NDP table 242. This information can be provided by other switch components, e.g., the switch components that build/maintain PVLAN mapping table 346, or the secondary PVLAN information can be provided by the software responsible for allowing users to configure PVLANs. By whatever mechanism is appropriate or convenient, such information is used by router functionality in a variety of ways.

FIG. 9 is a flow chart illustrating one of the ways in which the extended NDP table is used. More specifically, FIG. 9 illustrates techniques for ensuring that correct information (designed to accommodate PVLAN operation in the context of IPv6 multicast operation) is in the L3 forwarding table used during an RPF checking process.

The RPF check is performed by switch or router functionality at an incoming interface to determine whether the packet should be replicated for multicast transmission over outgoing interfaces. The RPF check is performed in multicast forwarding operations to ensure that copies of a multicast packet are not unnecessarily forwarded. This can occur because the network device might receive the same multicast packet from different ports. RPF implementations ensure proper distribution of multicast packets down a distribution tree by using the existing unicast routing table to determine "upstream" and "downstream" neighbors. In general, the RPF check procedure is: (1) the switch/router receives a multicast packet on an interface; (2) the RPF check implementation looks up the source address of the packet in a router's unicast routing table to determine whether the packet arrived on the interface that is on the reverse pack back to the source; (3) if the packet arrived on the interface leading back to the source (sometimes referred to as the RPF interface), the RPF check is successful and the packet is forwarded (according to information in a multicast routing table); and (4) if the check fails the packet is discarded.

Conventional RPF checking will erroneously fail in certain circumstances involving secondary PVLANs. For example, if host 151 is directly attached to multi-layer switch 100, its multicast packets will arrive with the VLAN identifier for the secondary PVLAN to which port 101 belongs, i.e., secondary PVLAN 162. However, conventional router processes for populating L3 forwarding table 344 would use the port's primary PVLAN identifier, and the lookup for the RPF check would thus fail because no entry based on the secondary PVLAN identifier would exist in the table. The process of FIG. 9 illustrates techniques for avoiding this problem using the extended NDP table of FIG. 8.

Operation begins at 900 where it is assumed that router software is operating and acquiring data about network stations through some well defined mechanism such as NDP, and the relevant data tables are already established. In step 905, the router software prepares one or more type/length/value (TLV) data structures having a format that defines the source IP address, group address, and VLAN identifier (S,G,C). This data structure is used to propagate the information to various switch components such as network management processor 110. An example of a TLV structure that can be transmitted is a TLV data structure for updating the L3 forwarding table. As part of the process, a determination is made (910) whether the relevant RPF interface (e.g., the interface on which a multicast packet will be received and thus an interface that will be checked) is a port that is part of a PVLAN. For example, a flag or other attribute value can be checked to determine PVLAN status. If the interface is a PVLAN interface, operation transitions to 915 where it is determined whether PVLAN information is available for the entry being prepared. If not, an NDP solicitation message is prepared and transmitted to the relevant host (920) in order to gather missing PVLAN information. In this case, operation returns to 915.

If it is determined that PVLAN information is available (e.g., there are entries for one or both of the primary and secondary PVLAN identifiers), operation transitions to 925. At this point, it has been determined that (1) the relevant RPF interface is part of a PVLAN, and that PVLAN identifier information is available, so the secondary PVLAN identifier is used in the TLV (925). This set of circumstances can occur, for example, when the host corresponding to the source IP address upon which the TLV is based is directly attached. If it was determined in 910 that the relevant RPF interface is not part of a PVLAN, the regular VLAN identifier is used in the TLV (930). In either case, operation proceeds to 935 where the properly formed TLV data structure is transmitted to relevant system components. Once received, the TLV information is used by those switch components to update various tables, such as the L3 forwarding table (940). The process ends at 945. In this way, the aforementioned erroneous RPF check failure is avoided by ensuring that the L3 forwarding table has the proper type of PVLAN identifier for each type of host.

Figure 10:
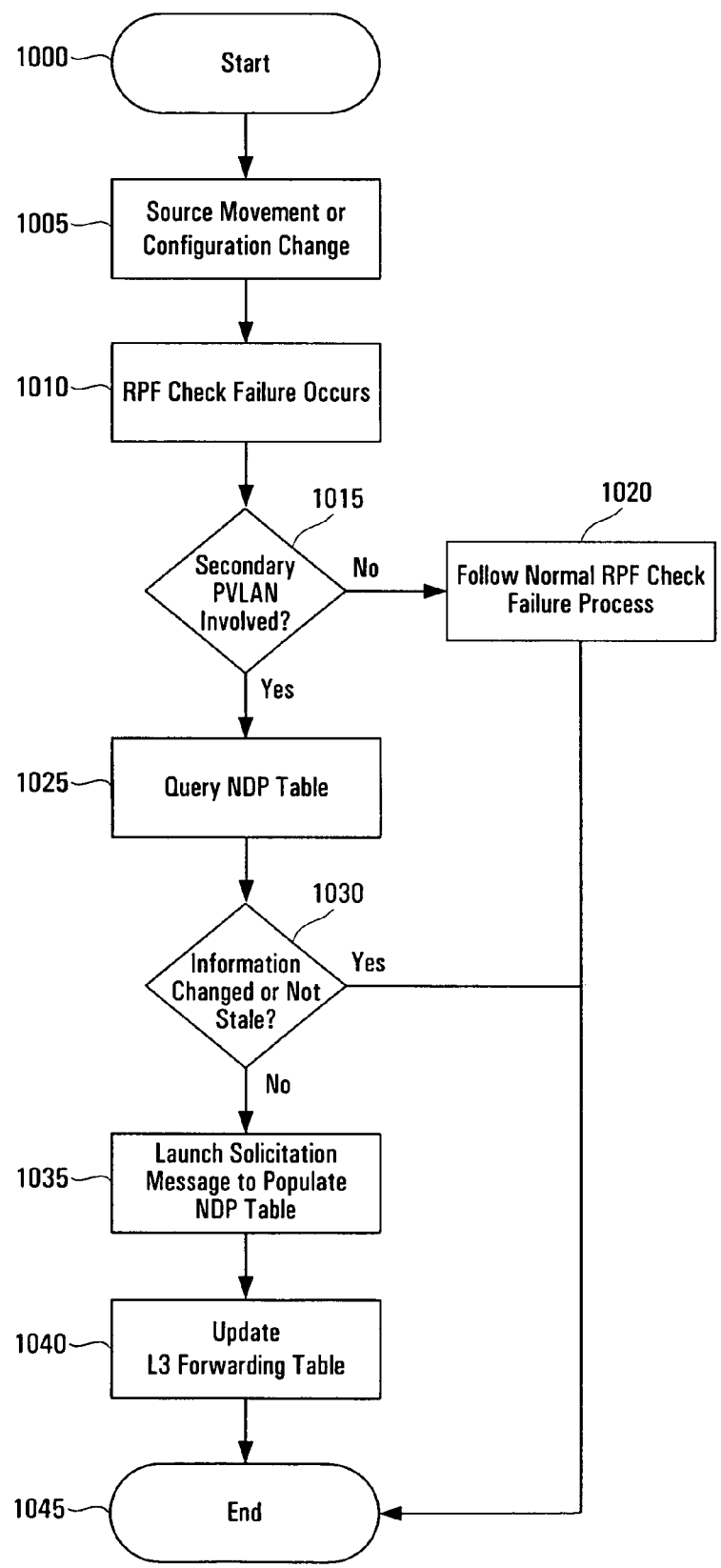
FIG. 10 is a flow chart illustrating still other techniques of the present invention.

FIG. 10 illustrates a solution to yet another problem associated with IPv6 multicast operation in conjunction with PVLANs. The problem stems from the fact that PVLAN source/host movement or configuration change are layer 2 events, and the layer 3 routing protocols are generally not aware of the change. The solution is based using RPF check failures as an indicator of possible PVLAN movement or configuration change.

Operation begins at 1000 where it is assumed that router software's RPF check software (or other router software functionality) has access to relevant data (e.g., NDP table 242) and is configured to take certain action upon detection of an RPF check failure. In step 1005, some source movement of configuration change occurs that affects PVLAN identification. At some point subsequent to the failure, an IPv6 multicast packet received at the switch fails its RPF check. As noted above, RPF check failure can legitimately occur for several reasons, so operation transitions to 1015 where it is determined whether the RPF check failure involved a secondary PVLAN. For example, the current entry in the L3 forwarding table might have the wrong secondary PVLAN identifier for the relevant host because the host has changed secondary PVLANs.

If no secondary PVLAN is involved, operation transitions to 1020 where a normal RPF check failure process is followed. In some embodiments, there may in fact be no further operations to perform, e.g., the IPv6 multicast packet that failed the RPF check has already been discarded. However, in some embodiments the packet may still need to be discarded, and other procedures followed. If the RPF check failure did involve a secondary PVLAN, the NDP table is then queried (1025). The purpose of this query is to ascertain (to some degree) why the RPF check failed. For example, a determination can be made (1030) whether there has been a change in the information that the router has about neighboring stations or if information is no longer to be trusted because it is stale. If the information is good or it has changed (i.e., the NDP table has already been properly updated), then the process terminates 1045). If instead it is determined that new information is needed for the NDP table, an NDP solicitation message is prepared and transmitted to the relevant host (1035) in order to gather new PVLAN information. That information is then used to update both the NDP table, and the L3 forwarding table (1040), and the process terminates (1045).

The flow charts of FIGS. 6, 9, and 10 illustrate many techniques that can be used to accommodate IPv6 multicast in PVLAN environments. Those having ordinary skill in the art will readily recognize that certain steps or operations illustrated in FIGS. 6, 9, and 10 can be eliminated or taken in an alternate order. Moreover, the methods described throughout this application (including FIGS. 6, 9, and 10) are typically implemented as application specific integrated circuits, programmable logic devices, and/or as one or more software programs or microcode elements encoded in a computer readable medium as instructions executable on one or more processors, FPGAs, ASICs, or the like. The computer readable medium can be any one of an electronic storage medium, a magnetic storage medium, an optical storage medium, and a communications medium conveying signals encoding the instructions. Separate instances of these modules, logic entities, and programs can be executed on separate devices in keeping with the methods described above. Thus, although certain steps have been described as being performed by certain devices, software programs, processes, or entities, this need not be the case and a variety of alternative implementations will be understood by those having ordinary skill in the art.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A network switch implemented method comprising:
   receiving a multicast listener discovery (MLD) report, wherein the MLD report is received on a port of the network switch;
   extracting, by the network switch, information from the MLD report, wherein the information comprises a first VLAN identifier;
   associating, by the network switch, the first VLAN identifier with the port on which the MLD report is received;
   searching a mapping table stored in a memory of the network switch for the first VLAN identifier; and
   updating a forwarding table stored in the memory of the network switch, wherein said updating comprises
      if the first VLAN identifier is found in a mapping table entry comprising a second VLAN identifier, using the second VLAN identifier, and
      if the first VLAN identifier is not found in the mapping table, using the first VLAN identifier.

2. The method of claim 1 wherein the MLD report includes one of:
   an indication that a specified host should be included in a multicast group; and
   an indication that the specified host should be excluded from the multicast group.

3. The method of claim 2 wherein said updating the forwarding table further comprises:
   if the MLD report includes an indication to include the specified host in the multicast group, adding a reference to the port on which the MLD report is received to an entry in the forwarding table, and
   if the MLD report includes an indication to exclude the specified host from the multicast group, removing the reference to the port on which the MLD report is received from the entry in the forwarding table.

4. The method of claim 1 wherein said updating the forwarding table further comprises:
   creating an entry in the forwarding table, wherein the entry comprises
      the first VLAN identifier, if the first VLAN identifier is not found in the mapping table, or
      the second VLAN identifier corresponding to the first VLAN identifier, if the first VLAN identifier is found in the mapping table.

5. The method of claim 1 wherein the forwarding table is a layer 2 forwarding table.

6. The method of claim 1 wherein the updating the forwarding table further comprises one of:
   adding a reference to the port on which the MLD report is received to an entry in the forwarding table indexed at least in part by the second VLAN identifier; and
   removing the reference to the port on which the MLD report is received from the entry in the forwarding table indexed at least in part by the second VLAN identifier.

7. The method of claim 1 wherein the first VLAN identifier is an identifier of a secondary private VLAN (PVLAN), and the second VLAN identifier is an identifier of a primary PVLAN of which the secondary PVLAN is a subset.

8. The method of claim 1 further comprising:
   propagating information used in the updating to at least one other table.

9. A non-transitory computer readable storage medium comprising program instructions executable to implement each of:
   receiving a multicast listener discovery (MLD) report, wherein the MLD report is received on a port of a network switch;
   extracting, by the network switch, information from the MLD report, wherein the information comprises a first VLAN identifier;
   associating, by the network switch, the first VLAN identifier with the port on which the MLD report is received;
   searching a mapping table stored in a memory of the network switch for the first VLAN identifier; and
   updating a forwarding table stored in the memory of the network switch, wherein said updating comprises
      if the first VLAN identifier is found in a mapping table entry comprising a second VLAN identifier, using the second VLAN identifier, and
      if the first VLAN identifier is not found in the mapping table, the updating uses the first VLAN identifier.

10. The non-transitory computer readable storage medium of claim 9 wherein the instructions for updating the forwarding table further comprise instructions for:
   creating an entry in the forwarding table, wherein the entry comprises
      the first VLAN identifier, if the first VLAN identifier is not found in the mapping table, or
      the second VLAN identifier corresponding to the first VLAN identifier, if the first VLAN identifier is found in the mapping table.

11. The non-transitory computer readable storage medium of claim 9 wherein the instructions for updating the forwarding table further comprise instructions for:
  if the MLD report includes an indication to include a specified host in a multicast group, adding a reference to the port on which the MLD report is received to an entry in the forwarding table, and
  if the MLD report includes an indication to exclude the specified host from the multicast group, removing the reference to the port on which the MLD report is received from the entry in the forwarding table.

12. The non-transitory computer readable storage medium of claim 9 wherein the instructions for updating the forwarding table further comprise instructions for:
  adding a reference to the port on which the MLD report is received to an entry in the forwarding table indexed at least in part by the second VLAN identifier; and
  removing the reference to the port on which the MLD report is received from the entry in the forwarding table indexed at least in part by the second VLAN identifier.

13. The non-transitory computer readable storage medium of claim 9 wherein the first VLAN identifier is an identifier of a secondary private VLAN (PVLAN), and the second VLAN identifier is an identifier of a primary PVLAN of which the secondary PVLAN is a subset.

14. An apparatus comprising:
  a means for receiving a multicast listener discovery (MLD) report, wherein the MLD report is received on an interface means of a network switch;
  a means for extracting, by the network switch, information from the MLD report, wherein
    the information comprises a first VLAN identifier;
  a means for associating, by the network switch, the first VLAN identifier with the interface means on which the MLD report is received;
  a means for searching a mapping table stored in a memory of the network switch for the first VLAN identifier; and
  a means for updating a forwarding table stored in the memory of the network switch, wherein said means for updating comprises
    if the first VLAN identifier is found in a mapping table entry comprising a second VLAN identifier, using the second VLAN identifier, and
    if the means for searching does not find the first VLAN identifier in the mapping table, using the first VLAN identifier.

15. A network device comprising:
  a processor;
  a memory coupled to the processor;
  a plurality of ports coupled to the processor; wherein the processor is configured to:
    receive a multicast listener discovery (MLD) report on at least one of the plurality of ports;
    extract information from the MLD report, wherein the information comprises a first VLAN identifier;
    associate the first VLAN identifier with the at least one of the plurality of ports on which the MLD report is received;
    search a mapping table stored in the memory for the first VLAN identifier; and
    update a forwarding table stored in the memory, wherein said processor is further configured to update the forwarding table
      if the first VLAN identifier is found in a mapping table entry comprising a second VLAN identifier, using the second VLAN identifier, and
      if the first VLAN identifier is not found in the mapping table, using the first VLAN identifier.

16. The network device of claim 15 wherein the network device is at least one of a switch, a multi-layer switch, and a router.

17. The network device of claim 15 wherein the processor is further configured to create an entry in the forwarding table, wherein the entry comprises
  the first VLAN identifier, if the first VLAN identifier is not found in the mapping table, or
  the second VLAN identifier corresponding to the first VLAN identifier, if the first VLAN identifier is found in the mapping table.

18. The network device of claim 15 wherein the processor is further configured to:
  add a reference to the port on which the MLD report is received to an entry in the forwarding table, if the MLD report includes an indication to include a specified host a the multicast group, and
  remove the reference to the port on which the MLD report is received from the entry in the forwarding table, if the MLD report includes an indication to exclude the specified host from the multicast group.

19. The network device of claim 15 wherein the processor is further configured to perform at least one of:
  adding a reference to the at least one of the plurality of ports on which the MLD report is received to an entry in the forwarding table indexed at least in part by the second VLAN identifier; and
  removing the reference to the at least one of the plurality of ports on which the MLD report is received to the entry in the forwarding table indexed at least in part by the second VLAN identifier.

20. The network device of claim 15 wherein the processor is one of an embedded processor, an ASIC, and an FPGA.

21. The network device of claim 15 wherein the first VLAN identifier is an identifier of a secondary private VLAN (PVLAN), and the second VLAN identifier is an identifier of a primary PVLAN of which the secondary PVLAN is a subset.

* * * * *